Dec. 30, 1930.  F. K. HOWARD  1,786,615
COMBINATION MOUNT FOR MACHINE GUNS
Filed May 18, 1929
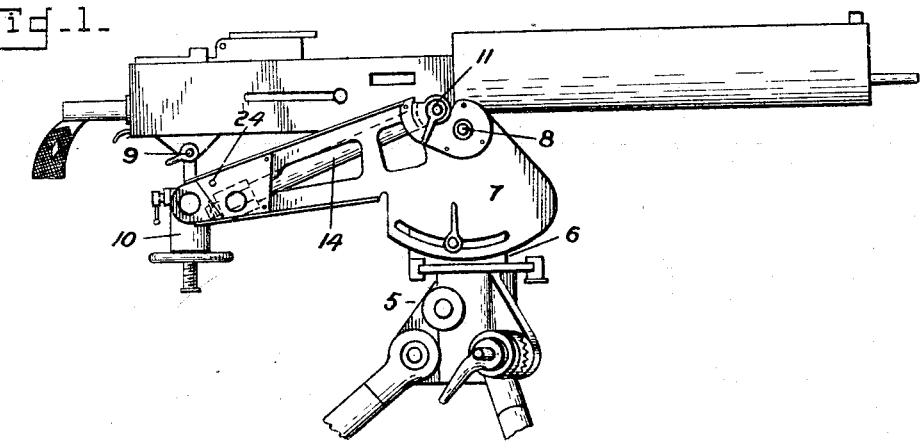
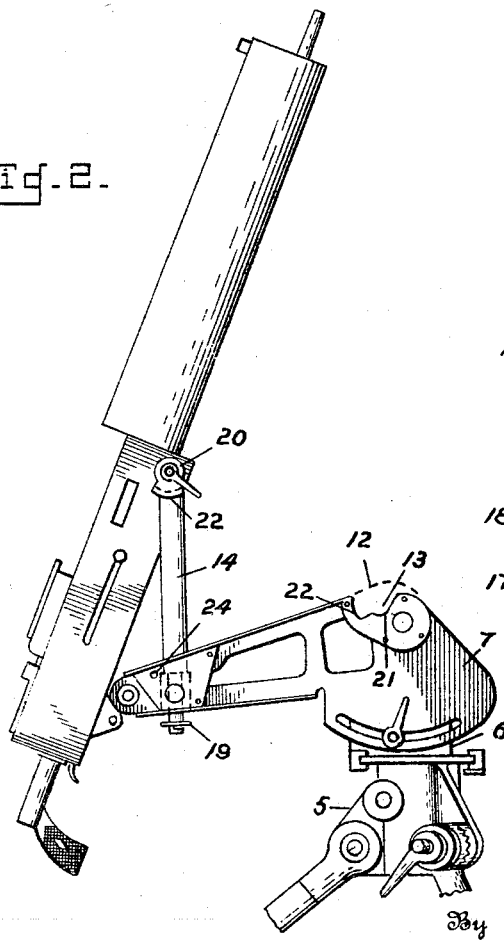
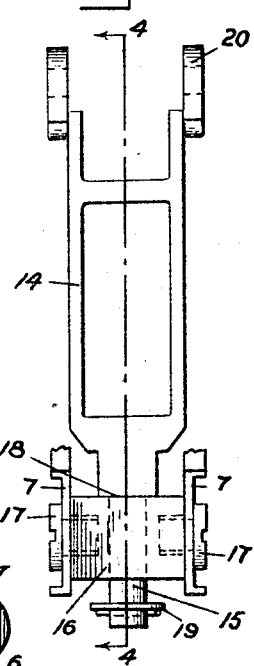
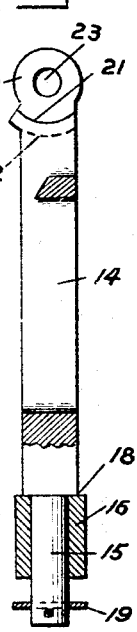
Inventor
Forrest K. Howard
By W. N. Roach
Attorney Patented Dec. 30, 1930

1,786,615

UNITED STATES PATENT OFFICE

FORREST K. HOWARD, OF EAST FALLS CHURCH, VIRGINIA

COMBINATION MOUNT FOR MACHINE GUNS

Application filed May 18, 1929. Serial No. 364,256.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a combination mount for machine guns.

In directing machine guns at low angles against ground targets a low mount is required in order to provide stability and meet the tactical requirements of the weapon. The employment of aircraft against ground targets and the consequent necessity of establishing a defense against this form of attack involves a reconstruction or modification of the standard infantry mount to render it capable of delivering effective fire at high angles.

The object of the present invention is to reorganize the standard low mount by equipping it with an antiaircraft adapter.

The essential requirements for such an adapter are that it must be a light and compact unit which can be incorporated without altering the characteristics of the mount and it must be capable of being conveniently moved in adjustment in a minimum time without requiring handling of the hot gun.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a mount equipped with the improved adapter and showing the position of a gun thereon when ordinarily supported for low angle firing;

Fig. 2 is a similar view with the gun in position for antiaircraft firing;

Fig. 3 is a plan view of the adapter; and

Fig. 4 is a sectional view on the line 4—4 of Fig. 3.

Referring to the drawings by characters of reference:

The standard infantry machine gun mount for low angle firing consists of a tripod 5 in whose socket is a pintle 6 which carries the cradle 7 by means of trunnions 8.

The machine gun shown in Fig. 1 is normally mounted in the cradle by means of a rear pin 9 passing through the upper end of the elevating mechanism 10 and by means of a front pin 11, which, when the original and unmodified cradle has the form indicated by the dotted lines 12 in Fig. 2, passes through the cradle side plates. In modifying the cradle to take the antiaircraft adapter, a portion of the cradle side plates lying below the dotted lines 12 is cut away to establish a specially formed bearing 13 (see Fig. 2).

The adapter consists of an arm or standard 14 whose rear extremity is a cylindrical stem 15 swiveled in a block 16 which is supported between the cradle plates forwardly of the elevating mechanism 10 by means of the trunnion pins 17. The stem 15 is of sufficient length to permit longitudinal movement of the standard, and this movement is limited by stop members 18 and 19 on the standard respectively engageable with the forward and rear faces of the block 16. For convenience the forward stop member 18 is constituted by a shoulder and the rear stop member 19 by a washer.

The standard terminates forwardly in a pair of spaced apertured ears 20—20 shaped to exactly fit in the bearings 13 in the cradle side plates. The ears and bearings contain two corresponding arcuate portions 21 and 22, the former being drawn on a smaller radius from the center of the ear or the center of the bearing than the latter and the latter directed towards the rear of the cradle. The entrance to the bearings is accordingly from a direction forwardly thereof. The portion 22 establishes a key which normally prevents pivotal movement of the standard when the standard is in its rearmost position with respect to the block 16. This is the position assumed by the standard when the gun is attached to the elevating mechanism by the pin 9 and to the standard by the pin 11 which in the arrangement described passes through the apertures 23 in the ears 20. When mounted in this manner for low angle firing, the gun is rigidly held with respect to the forces acting on it during recoil.

The position of adjustment of the standard for antiaircraft firing is shown in Fig. 2 and is obtained by removing the rear gun-attaching pin 9 and swinging the standard to an upright position until it is arrested by a rod 24 carried by the cradle adjacent to the block 16. Disengagement of the forward connection between the standard and the cradle is accomplished by pushing the gun in a forwardly direction and as the gun is secured to the standard through the front pin 11, the standard will be moved longitudinally and the ears 20 thereon will be constrained to move out of the bearings 13. When in the elevated position the mounting of the standard for axial rotation will facilitate following the target in azimuth.

The procedure outlined above is reversed in restoring the gun adapter to its normal mounting for low angle firing.

I claim:

1. A mount for machine guns embodying a support, a cradle on the support, a block trunnioned in the cradle, a standard mounted in the block for axial rotation and longitudinal movement, means for attaching a gun to the cradle in rear of the block, means for attaching a gun to the free end of the standard, bearings on the cradle for receiving the free end of the standard, said bearings having a forwardly directed entry, and means for limiting movement of the standard to an upright position.

2. A mount for machine guns embodying a support, a cradle on the support, a block trunnioned in the cradle, a standard mounted in the block for axial rotation and longitudinal movement, means for attaching a gun to the cradle in rear of the block, means for attaching a gun to the free end of the standard, and bearings on the cradle for receiving the free end of the standard, said bearings having a forwardly directed entry.

3. A mount for machine guns embodying a support, a cradle on the support, a block trunnioned in the cradle, a standard mounted in the block for longitudinal movement, means for attaching a gun to the cradle in rear of the block, means for attaching a gun to the free end of the standard, and bearings on the cradle for receiving the free end of the standard, said bearings having a forwardly directed entry.

4. A mount for machine guns embodying a support, a cradle on the support, a standard pivotally carried by the cradle and arranged for extension, a gun-connection on the free end of the standard, a bearing on the cradle for the free end of the standard, said bearing having a forwardly directed entry.

5. A mount for machine guns embodying a support, a cradle on the support, a standard pivotally carried by the cradle, a gun-connection on the free end of the standard, a bearing on the cradle for the free end of the standard, and means for limiting movement of the standard to an upright position.

6. A mount for machine guns embodying a support, a cradle on the support, an elevating mechanism for the cradle, a rear gun-connection on the cradle, a standard having a front gun-connection pivotally mounted on the cradle in proximity to the rear gun connection and a bearing in the forward part of the cradle for receiving the free end of the standard.

7. A mount for guns including a cradle, a standard swiveled in a pivotal mounting on the cradle and having a gun-connection and bearings on the cradle for receiving the free end of the standard.

8. A mount for guns including a cradle, a standard pivotally mounted at the rear of the cradle and having a gun-connection at its free end, means on the cradle for supporting the free end of the standard and means for limiting movement of the standard to an upright position.

FORREST K. HOWARD.